Oct. 22, 1963 M. H. LOONEY 3,107,915
BICYCLE EXERCISING DEVICE
Filed Dec. 16, 1960 2 Sheets-Sheet 1
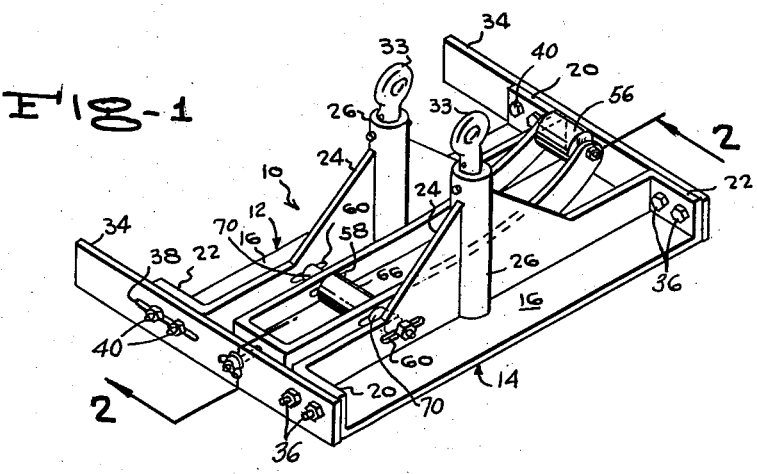
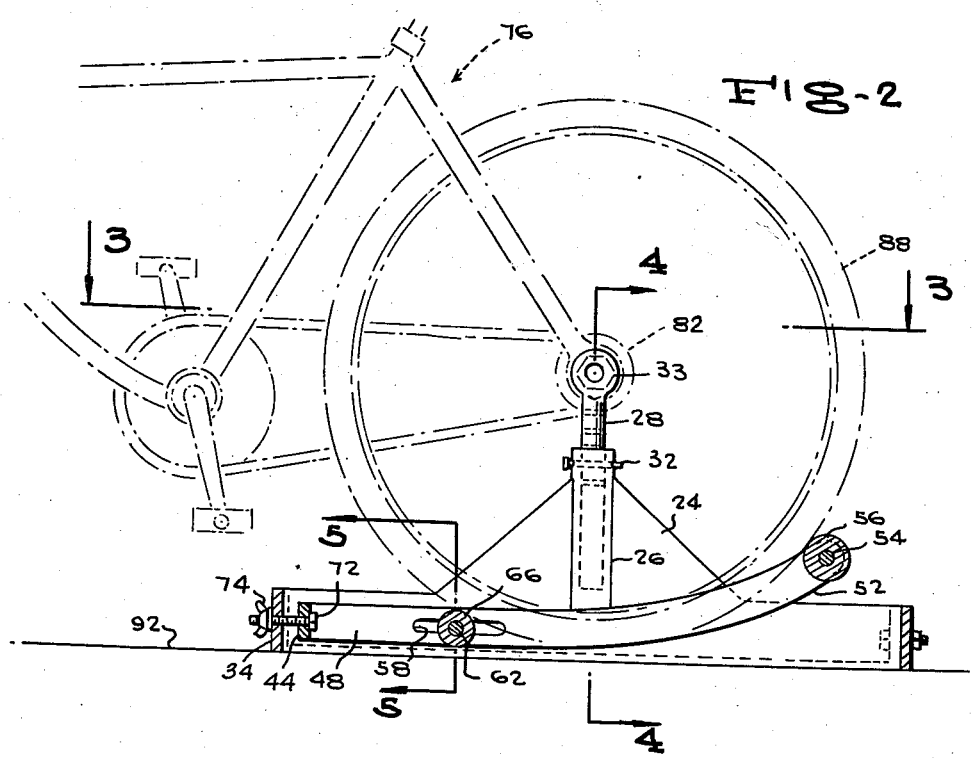
INVENTOR.
MERVYN H. LOONEY
BY
ATTORNEYS

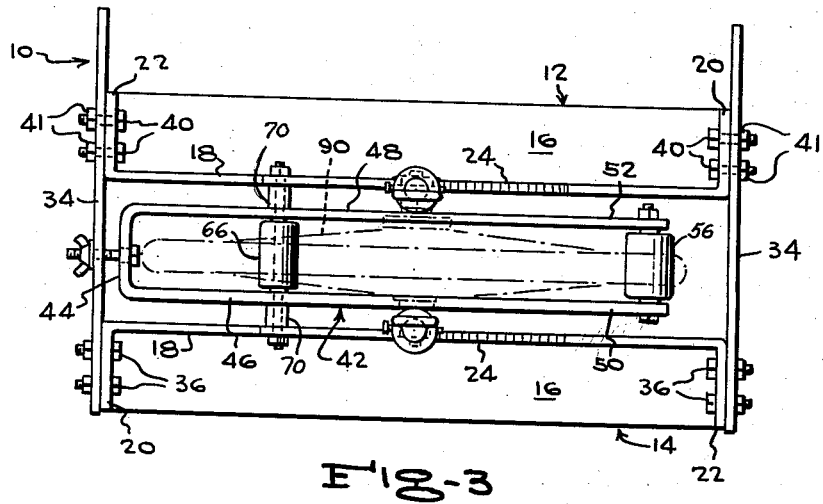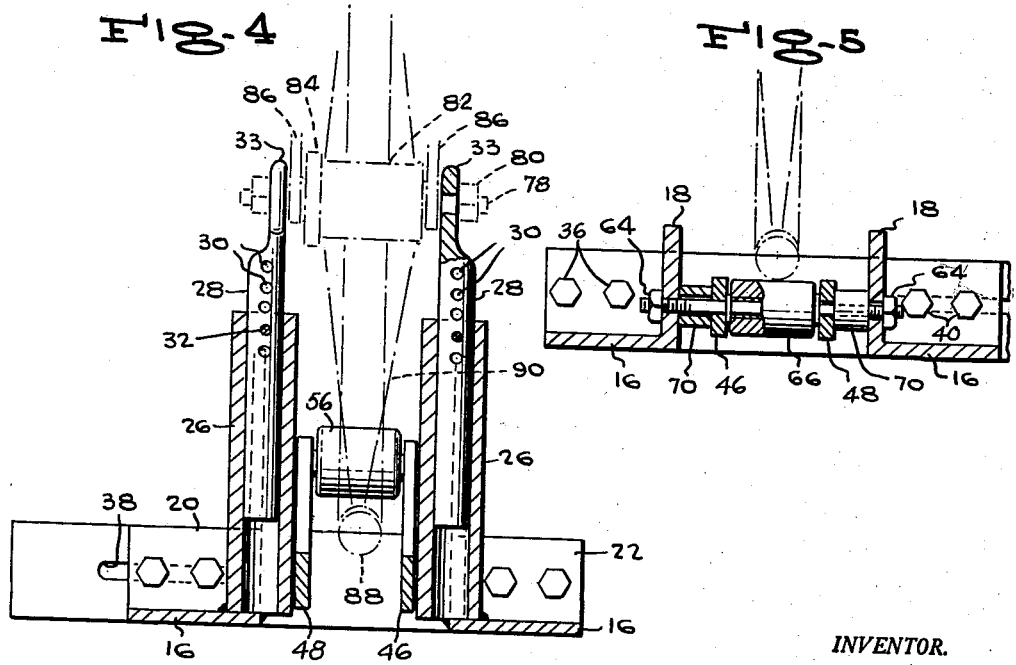

United States Patent Office 3,107,915
Patented Oct. 22, 1963

3,107,915
BICYCLE EXERCISING DEVICE
Mervyn H. Looney, 704 W. Division St., Galva, Ill.,
assignor of one-half to Grover W. Wertz, Peoria, Ill.
Filed Dec. 16, 1960, Ser. No. 76,270
1 Claim. (Cl. 272—73)

This invention relates to an exercising device designed primarily to exercise the leg muscles of an individual, and more specifically, the instant invention pertains to a support for the rear end of a bicycle which will permit the user to obtain the benefits of bicycling without actually engaging in that occupation.

One of the primary objects of this invention is to provide a bicycle exercising device which comprises a rigid support for the rear end of a bicycle, the support being of such nature that the rider may, at all times, be assured of his safety, and at the same time, pedal the bicycle as fast as he desires.

A further object of this invention is to provide a bicycle exercising device including a support for the rear wheel of the bicycle, the support including means for adjusting the pressure on the rear wheel of the bicycle to provide for light or strenuous leg exercise.

Another object of this invention is to provide a bicycle exercising device which does not require excessive room and which does not require any alteration in the construction of the bicycle when used in the conventional manner or when used as a stationary exercising device.

It is still another object of this invention to provide an exercising device for use in conjunction with a bicycle, the device including an adjustable support frame for the rear wheel of a bicycle, the frame being adjustable to accommodate the wheels of various diameters; together with means for adjusting a variable pressure device on the frame to obtain light or heavy exercising, as desired.

This invention contemplates, as a still further object thereof, the provision of a device of the type generally referred to supra, the device being non-complex in construction and assembly, inexpensive to manufacture, and durable in use.

Other and further objects and advantages of the instant invention will become more evident from a consideration of the following specification when read in conjunction with the annexed drawings, in which:

FIGURE 1 is a perspective view of a bicycle exercising device constructed in accordance with this invention;

FIGURE 2 is an enlarged detail cross-sectional view, FIGURE 2 being taken substantially on the vertical plane of line 2—2 of FIGURE 1, looking in the direction of the arrows;

FIGURE 3 is a top plan view of the device shown in FIGURE 1, FIGURE 3 being taken substantially on the horizontal plane of line 3—3 of FIGURE 2, looking in the direction of the arrows;

FIGURE 4 is an enlarged detail cross-sectional view, FIGURE 4 being taken substantially on the vertical plane of line 4—4 of FIGURE 2, looking in the direction of the arrows; and FIGURE 5 is an enlarged detail cross-sectional view, FIGURE 5 being taken substantially on the vertical plane of line 5—5 of FIGURE 2, looking in the direction of the arrows.

The bicycle exercising device constructed according to the teachings of this invention is designated, in general, by the reference numeral 10, and is seen to comprise a pair of angle iron members 12, 14 each having identical construction. Each angle iron member includes an elongated substantially rectangular base member 16 from a longitudinally-extending marginal edge of each projects an upright side wall 18. Each of the angle members is provided, at its respective opposed ends, with an integrally-formed substantially rectangular end plate 20, 22 which plates are perpendicular to both associated base members 16 and side walls 18. Intermediate the ends of each of the side walls 18 and integral therewith is an upstanding substantially triangular support plate 24. The support plates 24 are each bisected vertically by means of a substantially hollow cylindrical upright housing 26 which is welded or otherwise rigidly connected thereto and to the bases 16. Each of the cylindrical housings 26 slidably receive an elongated cylindrical support rod 28 having a plurality of axially-spaced vertically-aligned diametrically-extending openings 30 formed therein adjacent the upper end thereof whereby vertical adjustment of the rods 28 relative to the housings 26 may be made and held in adjusted position by means of the securing pin 32. The upper ends of each of the rods 28 terminate in integrally-formed flattened annular elements 33 to serve a function to be described.

Reference numeral 34 indicates a pair of elongated substantially rigid straps which are fixedly secured at one of their respective ends, as by bolts 36, to the end plates 20, 22 of the angle member 14. The straps 34, adjacent their other respective ends, are slotted at 38, the slots being aligned, and the end plates 20, 22 of the angle member 12 are juxtaposed relative thereto. Bolts 40 extend through the last-named end plates and through the slots 38 whereby the angle member 12 may be held in fixed longitudinal adjustment relative to the opposed pair of straps 34.

Reference numeral 42 denotes, in general, a substantially U-shaped cradle having a bight 44 from the opposed ends of which extend a pair of spaced and substantially parallel arms 46, 48, the latter terminating at their other ends in arcuate extensions 50, 52.

Mounted on a shaft 54 extending between the outer ends of the extensions 50, 52 is a roller 56, and the arms 46, 48 are each slotted as at 58, these slots being aligned with one another and with slots 60 formed in the side walls 18. A shaft 62 extends through these slots and is held in adjusted relation relative thereto by nuts 64. Mounted on the shaft 62 is a roller 66 held against axial displacement by means of conventional spacer collars 70.

To prevent rotation of the cradle 42 on or about the shaft 62, and to effect an adjustment to be described, the bight 44 is connected to the adjacent strap 34 by means of a bolt 72 and wing nut 74.

To use this exercising device 10, the rear axle wheel lock nuts (not shown) of a conventional bicycle 76 are removed (the bicycle being shown in dotted lines in FIGURE 2), and the bolts 40 are loosened to permit the angle member 12 to be moved laterally away from the angle member 14 to leave a sufficient distance therebetween so that the bicycle rear axle 78 may be aligned with a received in both of the annular members 33. To this end, one end of the axle 78 is inserted in the fixed one of the annular members 33, after which the movable or adjustable angle member 12 is moved to cause the other of the annular members 33 to receive the other end of the axle 78. Lock nuts 80 hold the axle 78 against displacement. The nuts 41 are then tightened on the bolts 40 to hold the angle member 12 in its fixed adjusted position. Since the length of the axle 78 and the hub 82, which taken together with the width of the brake assembly 84 and side frame members 86 of the bicycle may vary, the lateral adjustment of the angle member 12 is of importance.

In mounting the axle 78 in the annular members 73, the rods 28 are adjusted vertically so that the tire 88 carried on the wheel 90 is elevated above the plane of the supporting surface 92 (see FIGURE 2) of the device 10, and the wing nut 74 is adjusted to draw the roller 56 against the tire 88 rearwardly of the axle 78. The nuts 64 are then loosened and the roller 66 is shifted toward the axle 78 until the roller exerts the desired pressure on the tire 88, giving rise to the preferred energy output of the exerciser. The nuts 64 are now tightened.

It is to be understood, of course, that the tightening of the wing nut 74 will cause the roller 56 to exert still further pressure on the tire 88, so that two pressure adjustments are provided.

Having described and illustrated in detail one embodiment of this invention, it will be understood that the same is offered merely by way of example, and that this invention is to be limited only by the scope of the appended claim.

What is claimed is:

A bicycle exercising device comprising a pair of laterally-spaced elongated parallel and substantially rectangular straps, a pair of elongated angle iron members disposed in laterally-spaced and substantially parallel relation extending between said straps, means fixedly connecting the opposed ends of one of said angle irons with said straps immediately adjacent thereto, means connecting the opposed ends of the other of said angle members with said straps immediately adjacent thereto for adjustment longitudinally of said straps and laterally with respect to said one angle iron, an upright hollow cylindrical housing for each of said angle iron members and means rigidly securing the same thereto, a rod slidably mounted in each of said housings for vertical adjustment therein, means holding said rods in adjusted position, an annular member projecting upwardly from each of said rods to releasably receive the opposed ends of the rear wheel axle of a bicycle therein, a normally horizontal substantially U-shaped cradle disposed between said angle irons and including a bight from the ends of which, respectively, project a pair of laterally-spaced and substantially parallel arms having upwardly-curved free ends, means adjustably connecting said bight with one of said straps whereby said cradle may be drawn horizontally toward and moved away from said one strap, a first bicycle tire-engaging roller supported for rotation between said arms adjacent the free ends thereof, said arms each having a slot formed therein intermediate the ends thereof in registry with each other, said angle members each having a slot formed therein intermediate their respective ends and normally registering with said first-named slots, a shaft extending transversely of said cradle with its opposed ends projecting through said slots, means securing said shaft in adjusted position in said slots, a second bicycle tire-engaging roller mounted on said shaft, and said rollers being disposed on opposite sides of said axle.

References Cited in the file of this patent

UNITED STATES PATENTS

| | | |
|---|---|---|
| 330,430 | Seiler | Nov. 17, 1885 |
| 581,835 | Sturgis | May 4, 1897 |
| 2,261,846 | Dollinger | Nov. 4, 1941 |
| 2,534,967 | Hapman | Dec. 19, 1950 |
| 2,972,478 | Raines | Feb. 21, 1961 |

FOREIGN PATENTS

| | | |
|---|---|---|
| 521,467 | Great Britain | May 22, 1940 |
| 1,081,062 | France | June 2, 1954 |